United States Patent [19]

Yoshinaka et al.

[11] Patent Number: 5,318,837

[45] Date of Patent: * Jun. 7, 1994

[54] SOUNDPROOFING MATERIALS

[75] Inventors: Minoru Yoshinaka; Eizo Asakura; Mitsumasa Oku, all of Osaka; Takeshi Hamabe, Nishinomiya; Motoi Kitano, Kawanishi, all of Japan

[73] Assignee: Matsushita Electric Industrial Co., Ltd., Osaka, Japan

[*] Notice: The portion of the term of this patent subsequent to Oct. 2, 2007 has been disclaimed.

[21] Appl. No.: 809,623

[22] Filed: Dec. 17, 1991

Related U.S. Application Data

[63] Continuation of Ser. No. 452,441, Dec. 19, 1989, Pat. No. 5,164,260.

[30] Foreign Application Priority Data

Dec. 19, 1988 [JP] Japan .................. 63-321004

[51] Int. Cl.$^5$ ................ B32B 5/16
[52] U.S. Cl. .................... 428/328; 106/425; 181/284; 181/294; 428/323; 428/425.8; 428/425.9; 428/688; 428/703; 521/83; 521/92; 521/100; 521/155; 524/432
[58] Field of Search ............ 428/323, 328, 338, 308.4, 428/317.9, 425.8, 425.9, 688, 703; 181/284, 394; 106/425; 521/83, 92, 100, 125, 155; 524/432

[56] References Cited

U.S. PATENT DOCUMENTS

| | | | |
|---|---|---|---|
| 1,984,190 | 12/1934 | Hiffine | 154/44 |
| 2,052,517 | 8/1936 | Roos | 72/18 |
| 2,177,393 | 10/1939 | Parkinson | 20/4 |
| 2,331,599 | 10/1943 | Cyr | 423/623 |
| 2,668,123 | 2/1954 | Copeland | 117/11 |
| 2,694,025 | 11/1954 | Slayler et al. | 154/44 |
| 3,313,076 | 4/1967 | MacDonald | 52/496 |
| 3,396,070 | 8/1968 | Gambill et al. | 161/119 |
| 3,470,977 | 10/1969 | Shannon | 181/33 |
| 3,706,601 | 12/1972 | Strier et al. | 136/20 |
| 3,782,495 | 1/1974 | Nassof | 181/33 G |
| 3,915,917 | 10/1975 | Weiant et al. | 524/444 X |
| 4,452,841 | 6/1984 | Oliveira | 428/174 |
| 4,508,777 | 4/1985 | Yamamoto et al. | 428/280 |
| 4,634,630 | 1/1987 | Kamijyo | 428/399 |
| 4,960,654 | 10/1990 | Yoshinaka et al. | 428/614 |

FOREIGN PATENT DOCUMENTS 0325797 8/1989 European Pat. Off. .

OTHER PUBLICATIONS

M. L. Fuller, Journal of Applied Physics. "Twinning in Zinc Oxide", vol. 15, Feb. 1994, pp. 164-170.

*Primary Examiner*—D. S. Nakarani
*Attorney, Agent, or Firm*—Lowe, Price, LeBlanc & Becker

[57] ABSTRACT

Soundproofing materials consisting essentially of zinc oxide whisker particles having a nucleus body and needle crystal portions extending radially from the central body in different plural directions. The materials may comprise a support material for supporting the zinc oxide whisker particles. Such support materials include inorganic materials such as metals, ceramics, glasses, cements, mortars and various fillers in the form of powder, flakes, fibers and the like, and organic materials such as resins, rubbers, waxes and the like. These materials are particularly suitable for sound insulation, sound proofing, vibration damping and vibration insulation.

9 Claims, 1 Drawing Sheet

10 μm

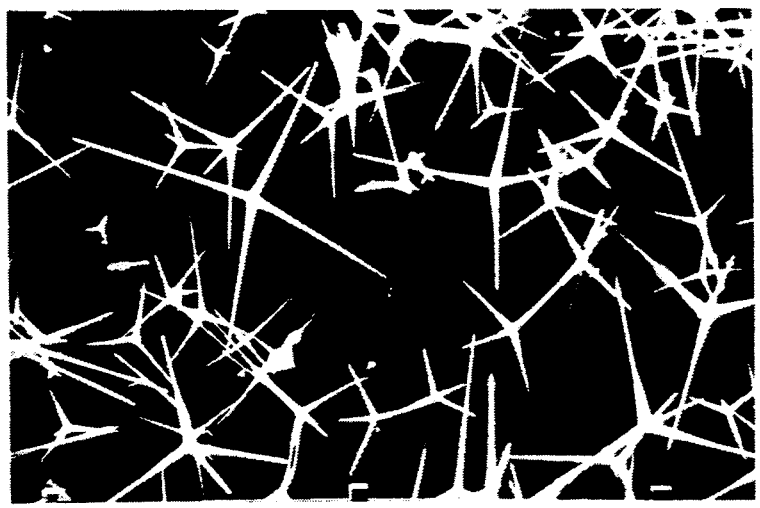
10 μm

SOUNDPROOFING MATERIALS

This application is a continuation of Application Ser. No. 07/452,441 filed Dec. 19, 1989, now U.S. Pat. No. 5,164,260.

BACKGROUND OF THE INVENTION

1. Field of the Invention

This invention relates to soundproofing materials and more particularly, to the use of tetrapod-shaped whisker particles of zinc oxide as a soundproofing or vibration-damping or deadening material utilizable in the fields of sound insulation, sound absorption, vibration damping and vibration insulation.

2. Description of the Prior Art

Various types of soundproofing and vibration-damping materials have been heretofore employed in various industries of automobiles, railroad vehicles, buildings and building materials, domestic appliances such as speakers, record players, video tape recorders, television sets, washing machines, vacuum cleaners, refrigerators, air conditioners, tableware cleaners and the like, industrial instruments, elevators, ducts, office appliances such as printers, plotters, key boards, duplicators and the like. kitchen utencils, stage reflectors, and the like.

Broadly, noises can be classified into two categories including sounds or noises transmitted through air and noises transmitted though solid matter. The sound insulation and sound absorption are a kind of measure against the air transmitted sounds. The vibration damping and insulation are against the solid transmitted sounds. From an angle of noise control, the absorption of sound or vibration energy leads to sound absorption or vibration damping. The reflection of the energy results in sound or vibration insulation.

The term "soundproofing" relating to both sound and vibration may be classified into sound insulation, sound absorption, vibration damping and vibration insulation which depend on the type of energy and how the energy is dealt with.

The sound insulation is to intercept sound waves on the way of their transmission so that a transmitted sound level is made smaller than an initial sound level. Materials capable of reducing the sound energy are usable as a sound insulating material whose characteristics are determined by surface density, rigidity in bending and internal loss. In a given frequency region, a larger weight results in a higher sound-insulating effect. For this purpose, high density resin mixtures in which large amounts of metallic powder, calcium carbonate or glass fibers are incorporated, or asphalt sheets have conventionally been in use.

The sound absorption is an absorption of vibration energy of sound as a heat energy by utilizing a viscosity resistance or frictional resistance of material so that reflection of sound waves is made small. To this end, materials having high voids such as open cell foamed plastics are used as a sound-absorbing material. Examples of such a sound-absorbing material include masses or boards of glass wool, asbestos, foamed urethane and the like, which are employed as shaped in conformity with various forms of surface material.

The vibration damping is to absorb an energy of vibrations or sounds transmitted through material as a heat energy converted as a result of deformation in shear or compression of the material. The vibration-damping material should favorably have a high loss coefficient and a high modulus of elasticity. The vibration-damping material is usually used after attachment to or coating on vibrating plates. Two types of the damping are known including a restriction type where a panel is attached on the vibration-damping material and a non-restriction type where no panel is used. Typical of the restriction type are vibration-damping steel sheets or plates of various types. Other vibration-damping materials include resins in which large amounts of particles such as of ferrites, metals, ceramics and the like, flakes such as of talc, mica and the like, and various fibers such as wollastonite and glass fibers.

The vibration insulation is achieved, for example, by inserting an appropriate spring between a vibration source and an object to be vibrated. The vibration insulating material acts as the spring, typical of which is vibration-insulating rubber.

In recent years, requirements for soundproofing have become very severe. There is a demand for soundproofing materials which have a high soundproofing efficiency and are rust-free and non-metallic in nature.

SUMMARY OF THE INVENTION

It is accordingly an object of the invention to provide a soundproofing material which has a high soundproofing efficiency for sound insulation, sound absorption, vibration damping and/or vibration insulation.

It is another object of the invention to provide a soundproofing material mainly composed of tetrapod-shaped zinc oxide whisker particles whereby the soundproofing efficiency can be remarkably improved.

Broadly, the soundproofing material of the invention consists essentially of zinc oxide whisker particles each having a nucleus or central body and a plurality of needle crystals extending radially from the nucleus body in different directions. Preferably, the zinc oxide whisker particles are of the tetrapod shape having four needle crystals extending or projecting from the central body. Each needle crystal should preferably have a length of from its basal part contacting the central body to the tip of not smaller than 3 micrometers.

These whisker particles may be used as they are by encasing or placing them in suitable means such as various types of containers or boxes, or by placing them between sheets or plates of various materials such as metals, resins, paper and the like. In the latter case, the sheets or plates should be fixed by any suitable means to keep the whisker particles therein. Alternatively, the whisker particles may be carried with suitable supports or incorporated in suitable materials to provide soundproofing compositions which are used in the form of thin or thick sheets, plates and the like.

BRIEF DESCRIPTION OF THE DRAWING

The sole FIGURE is an electron microphotograph showing the morphological crystalline structure of tetrapod-shaped ZnO whisker particles.

DETAILED DESCRIPTION AND EMBODIMENTS OF THE INVENTION

The zinc oxide whisker particles used in the present invention have several features. One of the features resides in their specific shape which is characterized by a three-dimensional tetrapod shape having a central or nucleus body and a plurality of needle crystals radially projecting from the body, which is quite unique as this kind of filler.

The needle crystal fibers of the zinc oxide whisker particles are very flexible and have a high modulus of elasticity, and the ZnO whisker particles are wooly as a whole.

Since the whisker is made of ZnO, it does not suffer any corrosion in air and has a very high specific density of about 5.8 as will not be expected among metal oxides. The ZnO whisker particles used in the present invention are made of a complete single crystal of ZnO which is a semiconductive material having piezoelectric properties.

The ZnO whisker particles can be applied to the fields of sound insulation, sound absorption, vibration damping and vibration insulation with the following advantages in the respective fields.

When applied in the field of sound insulation, they exhibits a great sound-insulating effect based on the high specific density and the energy loss produced by the piezoelectric properties.

In the field of sound absorption, high voids are ensured because of the tetrapod shape and the flexible wooly, fibrous particles, and the vibration energy can be efficiently converted into heat energy by the synergistic effect of the high specific density and piezoelectric properties.

For application to vibration damping, the whisker particles should preferably be used in combination with resins or ceramics. Such compositions are effective in obtaining a high internal loss produced by the mechanical resistance ascribed to the "anchoring effect" of the tetrapod-shaped structure and a high loss coefficient ascribed to the high specific density and the piezoelectric loss. In addition, a high modulus of elasticity can be attained by filling the whisker particles. Good vibration-damping effects are obtained.

In the field of vibration insulation, the whisker ensures efficient vibration insulation attained by the flexibility of the tetrapod-shaped ZnO whiskers, high specific gravity and the piezoelectric loss.

It is common for the application in all the fields set forth above that the tetrapod-shaped ZnO whisker particles can prevent anisotropy in physical properties and provide a soundproofing material which exhibits uniform soundproofing properties in all directions.

The zinc oxide whisker particles of the invention are described in more detail.

Such whisker particles can be prepared by thermally treating metallic zinc powder having an oxide layer thereon in an atmosphere containing oxygen. The thermal treatment is generally carried out at a temperature ranging from 700° to 1100° C., preferably from 800° to 1050° C. and more preferably from 900° to 1000° C. for 10 seconds or over, preferably 30 seconds to 1 hour and more preferably from 1 to 30 minutes. The resultant particles have an apparent bulk density of from 0.02 to 0.1 and are obtained at a high yield of not less than 70 wt % and are thus mass-producible. The whisker particles have a tetrapod-shaped structure as is particularly shown in the sole figure, from which the inherent shape and dimension of the whisker will be clearly seen.

The ZnO whiskers may contain those whiskers which have three, two or one needle crystal. These whiskers are considered to result from breakage of part of the needle crystals of the tetrapod-shaped ZnO whiskers. The whisker particles which have been partly broken and the broken needle crystals are both useful in the present invention. The X-ray diffraction analysis of the whiskers reveals that all the peaks correspond to those of ZnO. Moreover, the electron beam diffraction analysis indicates that the whiskers exhibit complete single crystallinity with a reduced degree of transformation and lattice defects. The content of impurities is very small and the results of atomic absorption spectroscopy reveal that the content of ZnO is 99.98%.

In view of the soundproofing properties, a whisker product wherein a major proportion, e.g. not less than 80 wt %, of the ZnO whisker particles have needle crystal portions whose length of from the basal part to the tip is smaller than 3 micrometers is not favorable. On the contrary, a major proportion, e.g. not less than 80 wt %, of the whisker particles should preferably have a length of the needle crystal portion of not less than 3 micrometers.

The soundproofing material of the invention may be used in various forms.

The ZnO whisker particles may be used in the form of a powder, in a deposited state or in a sintered state, or may be held on or in various types of supports.

The ZnO whisker powder may be encased or contained in containers or bags made of woven or non-woven fabrics, ceramics, glass, resins, rubbers, concrete, mortar, wax, semi-solid gels, foamed materials and the like. Alternatively, the powder may be covered with those materials mentioned above in a desired fashion.

The ZnO whisker powder in deposited state includes a whisker paper fabricated according to a paper-making technique or a filter cake of ZnO whisker obtained according to a wet filtration procedure (vacuum filtration). Of course, inorganic or organic binders may be used in combination in order to impart high mechanical strength to the sheet or filter cake.

The ZnO whisker powder, whisker paper or filter cake mentioned above may be sintered at an appropriate temperature of from 500° to 1600° C. while or after pressing at an appropriate pressure, thereby obtaining a sintered product. Sintering aids ordinarily used for this purpose may be appropriately used. Examples of such sintering aids include $Al(NO_3)_3 \cdot 9H_2O$, $LiCO_3$, $SbCl_3$, $MnCl_2 \cdot 4H_2O$, $Bi_2O_3$, $CoCl_2 \cdot 6H_2O$, $CrCl_3 \cdot 6H_2O$ and the like. The pressure is not critical and the whisker product is generally pressed at a pressure of from 1 to 2000 $kg/cm^2$, preferably from 10 to 400 $kg/cm^2$.

The whisker powder may be used in combination with other various support materials by incorporation or dispersion of the powder in the support materials or by supporting the whisker powder in fibers or meshworks. Such support materials include, for example, metals or alloys, various natural or synthetic resins or rubbers, inorganic materials, concrete or mortar, waxes, semi-solid gels or pastes, and foamed plastic materials. This is more particularly described. It will be noted that the term "support material" is intended to mean a material which is capable of supporting the whisker powder by incorporation or dispersion in the material or capable of spatially supporting the powder such as in spaces of fibers or meshworks.

Metals such as Al or its alloys, Mg, Ti, Cu, Pb, Sn, Be, Fe, stainless steel and alloys thereof with or without additional elements may be used in combination with the whisker powder. In application, the whisker powder or particles may be placed between metal plates such as vibration-damping steel plates, or may be dispersed in metal matrices or may be dispersed in metallic powder.

Moreover, the whisker powder may be dispersed in various resins and molded or shaped as a sheet, plate, block or board for use as a soundproofing material. The resins may be thermoplastic or thermosetting in nature. Examples of the thermosetting resin include various epoxy resins, unsaturated polyester resins, urethane resins, silicone resins, melamine-urea resins, phenolic resins, and blends or resin alloys thereof.

The thermoplastic resins are not critical in kind and include, for example, polyvinyl chloride, polyethylene, chlorinated polyethylene, polypropylene, polyethylene terephthalate, polybutylene terephthalate, polyamides, polysulfones, polyether imides, polyether sulfones, polyphenylene sulfides, polyether ketones, polyethyer ether ketones, ABS resins, polystyrene, polybutadiene, polymethylmethacrylate, polyacrylnitrile, polyacetals, polycarbonates, polyphenylene oxide, ethylene-vinyl acetate copolymers, polyvinyl acetate, ethylene-tetra-fluoroethylene copolymer, aromatic polyesters, polyvinyl fluoride. polyvinylidene fluoride, polyvinylidene chloride, teflons, and blends or alloys thereof. For use in combination with these resins, the tetrapod-shaped ZnO whisker powder should preferably be kept as it is in the resin. A variety of methods which have been conventionally employed for such purposes may be used. Mixing, kneading, extruding and molding procedures wherein stress or shear force against the ZnO whisker is reduced to an extent as small as possible should be used. A preferred method is that the ZnO whisker powder is mixed with a liquid thermosetting resin, such as an epoxy resin, an unsaturated polyester resin, a urethane resin or a silicone resin, having a relatively low viscosity, followed by molding and curing. Alternatively, resins may be dissolved in an appropriate solvent to obtain a solution with a low viscosity, to which the ZnO whisker powder is added, followed by evaporation of the solvent to obtain a whisker-dispersed resin sheet or the like articles. Still alternatively, a fine powder of resin having a size of several micrometers to seven tenths micrometers and the ZnO whisker powder are mixed, which is heated or dissolved in solvent to cause the powder to be uniformly dispersed in the resin. In addition, dispersions of finely divided polyethylene in water and various polymer emulsions may be used.

Rubber materials such as natural and synthetic rubbers or elastomers may also be used as a support material. Such rubber materials used in the present invention are those which should not adversely influence the ZnO whisker powder and should preferably have good soundproofing characteristics. In this sense, polyurethane rubbers are most preferably used. Next, acrylic rubbers, silicone rubbers, butadiene rubbers, isobutylene rubbers, polyether rubbers, isobutylene-isoprene copolymers and isocyanate rubbers are preferably used. Depending on the purpose, nitrile rubbers, chloroprene rubbers, chlorosulfonated polyethylene, polysulfide rubbers and fluorine rubbers may be used. Moreover, solutions of natural rubbers in solvents may also be used.

When a rubber material is used as the support material, the breakage of the whisker should be suppressed to a minimum by the procedures set out with respect to the resin supports.

As a matter of course, when the resins or rubbers are used as a support material, such resins or rubbers may be in the form of paints. Paints of epoxy resins, acrylic resins, urethane resins and the like are readily available and are, in fact, useful for dispersing the whisker powder therein thereby giving a soundproofing thick film with a high heat resistance and good weatherability.

The whisker powder may be dispersed in various inorganic solid materials in the form of powder, fibers, flakes, granules and the like thereby forming soundproofing mixtures. These mixtures may be used by incorporation in suitable containers or by placing them in spaces requiring soundproofing.

For instance, the whisker powder may be dispersed in powders or enamels of various ceramics and glasses. In addition, the whisker powder may be mixed with clay, glass fibers, asbestos, mica, sand and the like to obtain soundproofing powder mixtures or fiber materials such as woven or non-woven fabrics.

If the whisker powder is dispersed in cements or mortars, building materials having soundproofing properties can be obtained.

For specific purposes such as of vibration insulation of electronic parts such as capacitors, the whisker powder may be dispersed in or mixed with waxes such as paraffin wax, polyethylene wax, microcrystalline wax and the like.

Moreover, the whisker powder may be dispersed or supported in gel-like semi-solid materials such as agar-agar or gelatin, or in highly viscous materials such as pastes of natural or synthetic polymeric or high molecular weight substances, rubber pastes, highly viscous polybutene, and the like.

The whisker powder may be supported in foamed materials such as polyurethane foams, epoxy resin foams or styrene foams. In view of characteristic properties, urethane foams are the best, followed by the epoxy resin foams and then the styrene foams.

The greatest effect is expected when the whisker powder supported or dispersed in the various support materials or matrices is used as keeping the tetrapod shape. The tetrapod-shaped whisker powder may be partly or even wholly broken during working operations to such an extent that simple needle crystals are formed. Even in this state, good soundproofing effects will be expected.

Although depending on the size of the ZnO whisker powder, the degree of breakage of the whisker, the type of matrix or support material, the manner of the support and the type and amount to filler, the whisker powder should preferably be used in amounts of not less than 1 wt % of the total of the whisker powder and the support or matrix material, within which soundproofing properties are significantly improved. More preferably, the amount should be not less than 5 wt %. A great soundproofing effect can be achieved only with very small amounts of the whisker powder.

In some cases, the combination with other fillers is very advantageous from the standpoint of costs and productivity, especially when the whisker powder is dispersed in resins, rubbers and the like materials. Examples of particulate fillers include metallic powders such as iron, nickel, stainless steel and the like, ferrite powder, calcium carbonate, carbon black, aluminium silicate, and beads and microballons of various types of materials. Flaky fillers include, for example, metallic flakes such as aluminum flakes, mica, talc, glass flakes and the like. Fibrous fillers include, for example, metallic fibers such as iron, stainless steel and the like, mineral fibers, gypsum fibers, carbon fibers, glass fibers, wollastronite fibers, SiC fibers, boron fibers, potassium titanate whisker, SiC whisker, and the like.

These fillers may be used singly or in combination. When the ZnO whisker powder is used in combination with the fillers, the mixing ratio of the ZnO whisker in the total of the ZnO whisker and the fillers is not less than 1 wt %, preferably not less than 10 wt %.

The range of frequency for which the soundproofing material of the invention is suitably used covers from a sound with a very low frequency to a supersonic wave. The soundproofing material is particularly effective for sounds and vibrations having an audible range of from 10 Hz to 20 KHz, preferably from 100 Hz to 10 KHz, more preferably from 300 Hz to 5 Hz.

The present invention is described by way of examples.

EXAMPLE 1

Tetrapod-shaped ZnO whisker powder (having a needle crystal length of 100 to 200 micrometers) was filled in a cloth bag to make a soundproofing mat having a thickness of 10 cm, a width of 1 meter and a length of 1 meter. The bulk density was 0.06 g/cc. Six soundproofing mats were combined to give a hollow cubic assembly used to check a soundproofing effect. At the center of the cubic sample was provided a sound-generating source and a soundproofing effect was measured at a position of 1 m away from the sound-generating source and at 50 cm from the floor. The frequency being measured was 400 Hz with the results shown in Table 1.

COMPARATIVE EXAMPLES 1 TO 4

For comparison, soundproofing materials other than the ZnO whiskers were used in the same manner as in Example 1, with the results shown in Table 1.

TABLE 1

| | Soundproofing Material | Bulk Density (g/cc) | True Density | Soundproofing Effect |
|---|---|---|---|---|
| Example 1 | tetrapod-shaped ZnO whisker | 0.06 | 5.8 | −13 dB |
| Comp. Ex. 1 | glass fibers | 0.01 | 2.49 | −5.5 dB |
| Comp. Ex. 2 | mica | 0.35 | 2.7 | −6.8 dB |
| Comp. Ex. 3 | asbestos | 0.11 | 2.5 | −5.8 dB |
| Comp. Ex. 4 | calcium carbonate (wollastonite) | 0.21 | 2.9 | −7.9 dB |

EXAMPLE 2

Tetrapod-shaped ZnO whisker powder having an average length of needle crystals ranging from the basal part to the tip of 20 micrometers, an average diameter of the basal part of 0.7 micrometers and a bulk density of 0.09 were mixed with a polycapramide (Nylon-6) resin in an amount of 30 wt % of the mixture and injection molded to obtain a 3 mm thick plate. This plate was subjected to a vibration-damping test at 4 KHz to evaluate a loss coefficient at 20° C. The vibration-damping property of −13 dB as compared with a filler-free polyamide resin was obtained.

EXAMPLES 3 TO 5 AND COMPARATIVE EXAMPLE 5

ZnO whisker powder as used in Example 2 and other fillers were mixed and dispersed in a polycapramide (Nylon-6) resin in amounts indicated in Table 2, followed by the procedure of Example 2 to obtain plates. The respective plates were subjected to measurement of vibration-damping with the results shown in Table 2.

For comparison, talc alone was used and dispersed in the polyamide resin.

TABLE 2

| | Filler (wt %) | | Vibration Damping |
|---|---|---|---|
| Example 2 | ZnO whisker (30) | | −13 dB |
| Example 3 | ZnO whisker (10) | mica (40) | −14 |
| Example 4 | ZnO whisker (15) | ferrite powder (50) | −12 |
| Example 5 | ZnO whisker (7) | talc (50) | −11 |
| Comp. Ex. 5 | — | talc (57) | −4 |

As will be apparent from the above results, the ZnO whisker powder has good vibration-damping properties. The electrophotographic observation in section of the resin plate revealed that the remaining rate of the tetrapod-shaped whisker is about 4% on average and most whisker particles suffer breakage into simple needle whiskers.

EXAMPLE 6

Tetrapod-shaped ZnO whisker powder having an average length of needle crystals ranging from the basal part to the tip of 50 to 150 micrometers, an average diameter of the basal part of 3 to 8 micrometers and a bulk density of 0.04 was formulated in a solvent-free epoxy resin paint in an amount of 5 wt % based on the total solid, followed by application onto a 2 mm thick iron plate in a wet thickness of 400 micrometers, drying and curing. As a result, it was found that when compared with the case wherein the paint was not applied, the vibration-damping effect (loss coefficient at 20° C.) of −10 dB at 500 Hz was achieved.

The observation of the section revealed that most whiskers kept the tetrapod form.

What is claimed is:

1. A soundproofing material comprising zinc oxide particles, each zinc oxide particle having a tetrapod-shaped structure which includes a nucleus body and needle crystal portions extending radially from the nucleus body in four different directions, each needle crystal having a length from its basal part contacting the nucleus body to the tip not smaller than 3 micrometers and an inorganic filler, said zinc oxide particles being mixed with said inorganic filler in an amount of not less than 1 wt % based on the total of said zinc oxide particles and said inorganic filler, the mixture of said zinc oxide particles and said inorganic filler placed in a container and being encased thereby.

2. The soundproofing material according to claim 1, wherein said zinc oxide amount is not less than 5 wt %.

3. The soundproofing material according to claim 1, wherein said inorganic filler is in the form of particles or fibers.

4. A soundproofing material which consists essentially of a resin or rubber and zinc oxide whisker particles, each zinc oxide whisker particle having a tetrapod-shaped structure which includes a nucleus body and needle crystal portions extending radially from the nucleus body in four different directions, each needle crystal having a length from its basal part contacting the nucleus body to the tip not smaller than 3 micrometers, said zinc oxide particles being dispersed in said resin or rubber in an amount of not less than 1 wt. % based on the total of said zinc oxide particles and said resin or rubber.

5. The soundproofing material according to claim 4, wherein said resin is a thermosetting resin.

6. The soundproofing material according to claim 4, wherein said resin is a thermoplastic resin.

7. The soundproofing material according to claim 4, wherein said resin is a polyurethane rubber.

8. The soundproofing material according to claim 4, wherein said resin or rubber is foamed.

9. A soundproofing material which comprises a mortar or cement and zinc oxide whisker particles, each zinc oxide whisker particle having a tetrapod-shaped structure which includes a nucleus body and needle crystal portions extending radially from the nucleus body in four different directions, each needle crystal having a length from its basal part contacting the nucleus body to the tip not smaller than 3 micrometers, said zinc oxide particles being dispersed in said mortar or cement in an amount of not less than 1 wt. % based on the total of said zinc oxide particles and said mortar or cement.

* * * * *